March 8, 1932. J. ELLBERG ET AL 1,848,703
RELIEF VALVE FOR HEATING SYSTEMS
Filed Oct. 18, 1930
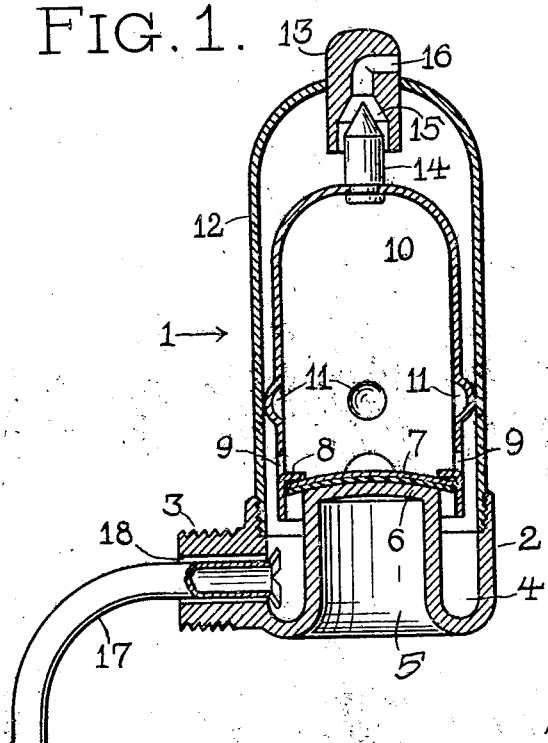
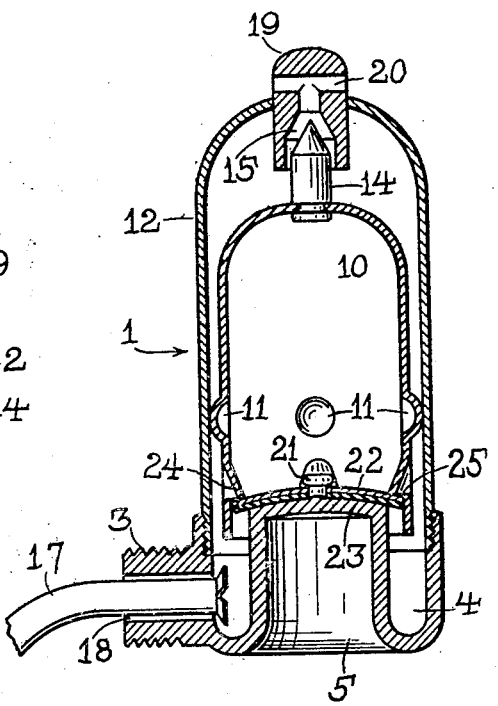
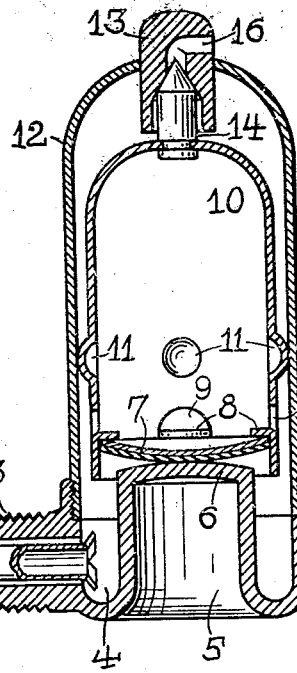
Inventors
John Ellberg
Magnus Cronwall Patented Mar. 8, 1932

1,848,703

UNITED STATES PATENT OFFICE

JOHN ELLBERG, OF NEW YORK, AND MAGNUS CRONWALL, OF BROOKLYN, NEW YORK

RELIEF VALVE FOR HEATING SYSTEMS

Application filed October 18, 1930. Serial No. 489,562.

This invention relates to relief valves for fluid heating systems, and more particularly to that class wherein heat conduction operates both positively and negatively upon thermostatic means to raise and lower an open float and thereby close or open a check valve member in said relief valve.

The main object of our invention is to provide a valve of the mentioned character which has a float therein provided with vents to allow the escape of steam and water therefrom, in order to maintain the float in standard condition of weight.

Another object is to greatly simplify the construction of this class of valve in order to materially reduce the cost of manufacture.

A further object is to simplify the form of the parts that make up the structure of the valve and thereby attain more effective and prompt operation of the valve as a whole.

Other objects and the various advantages and features inherent in our invention will appear more fully in detail as the specification proceeds.

The present application is also in the nature of an improvement over the application filed October 12, 1929, bearing the Serial Number 399,248 now Patent 1,779,228 bearing date of October 21, 1930, for relief valves for heating systems.

In the accompanying drawings forming part hereof,

Fig. 1 is a vertical axial section of a relief valve made according to our invention and embodying the novel features of the same in practical form.

Fig. 2 is a similar view with certain parts in altered relative positions, as when acted upon by heat.

Fig. 3 shows a modification of the valve.

In the views, the same or duplicate parts are noted by the same reference numerals.

In the practice of our invention, a relief valve, generally indicated by 1 has a heat conducting casing 2 which is provided with a threaded projection 3 by which the valve as a whole may be attached to a steam or other fluid heating radiator or the like. Within this casing 2 is a heating and cooling dome 5, while the marginal space about said dome constitutes a fluid chamber 4, the upper convex portion of the dome at 6 being designed to support a bimetallic or heat flexing disk 7 and conduct heat to or from said disk in order to produce corresponding flexure thereof, as will be explained.

The casing 2 is surmounted by a bell 12 which is screwed or otherwise secured thereto, the upper portion of the bell being provided with a vent valve housing 13 rigidly fastened on the bell by means of brazing, soldering, welding, or in any other well known manner. The interior of the bell 12 is occupied by a hollow float 10 whose sides are provided with a plurality of protuberances 11, 11 which generally center the float within the walls of the bell, by loose contact therewith, below the general level of the protuberances, a plurality of inward projections 8, 8 have been struck to primarily form abutments in the float for the edges of the bimetallic disk 7, so that the float may be directly supported by said disk. Another purpose is also served by these projections, for in the wall above each is a vent 9 which allows any water or stream that may at any time enter the interior of the float to again escape from above the disk 7. The upper vent valve housing 13 has a valve seat 15 therein leading up to a side vent 16, while the upper portion of the float is provided with a corresponding valve closure member 14 adapted to engage in the seat 15 to close the same.

At the bottom of the relief valve as a whole, the threaded projection 3 has a drain siphon 17 very loosely located in the aperture 18, which condition permits the entrance of steam through part 3 about the siphon into chamber 4. Normally, the valve as a whole is cold and the bimetallic disk 7 is flexed downwardly in conformable contact with the upper surface of convex portion 6 of the dome 5. When steam enters chamber 4 about the dome, the latter is heated rapidly to the temperature of the steam, the heat being conducted through the vertical walls of the dome to the upper convex part 6. This, of course immediately conducts the heat to the bimetallic disk 7, whereupon the latter promptly flexes upward so as to present the appearance illustrated in Fig. 2. However, the steam upon entering the valve directly affects the disk more quickly than the dome and is actually the main factor in heating the disk and causing the same to flex. In the normal cold condition of the valve as shown in Fig. 1, the float is in its lower or rest position in which the closure member 14 of the vent valve is down out of contact with the vent valve seat 15. This condition allows atmospheric air to enter the vent valve, but when steam enters chamber 4, the air is driven out about float 10 through vent 16 until the steam, and secondarily, the dome 5, 6 have had opportunity to heat and flex disk 7. When the disk has flexed upward from the effect of the heat, it has at the same time raised the float upward within bell 12 and thereby also raised member 14 into closing engagement with the seat 15 in the check valve.

When, for any reason the steam has ceased to enter chamber 4 through port 18, the interior hollow portion of the dome 5 soon chills by its contact with the outside air and the heat of convex part 6 is both similarly dissipated and also conducted away by the vertical walls of the dome. As soon as the temperature has appreciably lowered, the disk 7 is also chilled, partly by the dome and promptly flexes downward again, allowing float 10 to drop and open vent valve 13 and permitting air to enter vent 16 and break the vacuum in the valve as a whole. Water of condensation collecting upon disk 7, if any, will drain off the same out through vents 9 into chamber 4, where also water collects from within the bell itself. This water drains out through the siphon 17 and the whole relief valve is thus maintained at peak efficiency at all times.

In Fig. 3 some slight modifications are shown, the valve seat 15 of the vent valve in the upper portion of bell 12 having a double vent 20 for speedy action in its vent valve 19, while a rivet 21 holds the bimetallic disk 22 centered on the convex dome top 23 in order to assure accurate movements. Here also, the inward projections or lugs 8 and their accompanying vents 9 of the first views are replaced by indentations 24 which are preferably cut through at the bottom to form vents as at 25, the same operating also to drain the interior of the float and the top surface of the thermostatic member 22. Even if said vents are thus rather confined theoretically, they are practical, for the disk or thermostatic member 22 does not fit against the same projections 24 in a water tight fit owing to the fact that it is always flexed, either upward or downward, so that water will drain at the very edge thereof or otherwise within the edge thereof through vents 25.

Various modifications may be resorted to within the scope of our invention, and parts may be used without others.

Having now fully described our invention, we claim:

1. A relief valve for heating systems including the combination, with a hollow casing having a supporting and cooling dome and a bell spaced about said dome, of a normally dished flexible thermostatic member supported in heat conductive contact upon said dome, a float loosely disposed within said bell and having an open bottom, within which said thermostatic member is located, there being a vent valve located in the upper portion of said bell and a corresponding closure member disposed upon said float, and means upon said float normally engaging said thermostatic member whereby to support and move said float and operate said vent valve.

2. A relief valve for heating systems including the combination, with a casing having a supporting and cooling dome therein and a hollow bell spaced about said dome and surmounting said casing, of a flexible thermostatic member disposed upon said dome in heat conductive contact therewith, a hollow float loosely disposed within said bell and surrounding said thermostatic member, a plurality of inward projections formed in the walls of said float and extending over the edges of said thermostatic member whereby flexure of the latter will raise or lower said float, and a vent valve located in the upper portion of said bell having a closure member thereof secured upon said float, whereby movements of the float may open or close said vent valve.

3. A relief valve for heating systems including, in combination, a casing having a supporting and cooling dome therein and enclosed by a hollow bell, a vent valve housing disposed upon said bell having a vent valve seat within the bell and communicating with the outer air, a thermostatic member conformably disposed upon said dome when cold, a float surrounding said thermostatic member and bearing a closure member adapted to engage said vent valve seat, and means including an inward projection in said float extending over said thermostatic member for supporting said float upon said thermostatic member in all flexed positions thereof, there being also a vent in said float for draining off said thermostatic member and draining the interior of said float.

4. In a relief valve of the character described, including a casing having a supporting and cooling dome enveloped by a hollow bell, and a thermostatic member of heat flexible material supported in heat conductive contact upon said dome, a hollow and open bottomed float arranged within said bell having a plurality of inward projections struck into the walls thereof so as to extend in upon the edges of said thermostatic member, said projections providing side vents in the walls of the float for draining the interior and also the thermostatic member, and a vent valve casing upon said bell arranged to be opened or closed upon movement of said float and flexure of said thermostatic member.

5. In a relief valve of the character described, a hollow float having an open bottom, a flexible thermostatic member forming a loose bottom therein, a plurality of inward projections piercing the walls of said float and forming abutments for said thermostatic member so as to support said float thereon, there being means to alter the temperature of said thermostatic member by conducting away the heat and chilling the same, and a vent valve opened or closed by the movements of said float upon flexure of said thermostatic member.

JOHN ELLBERG.
MAGNUS CRONWALL.